United States Patent Office 2,928,235
Patented Mar. 15, 1960

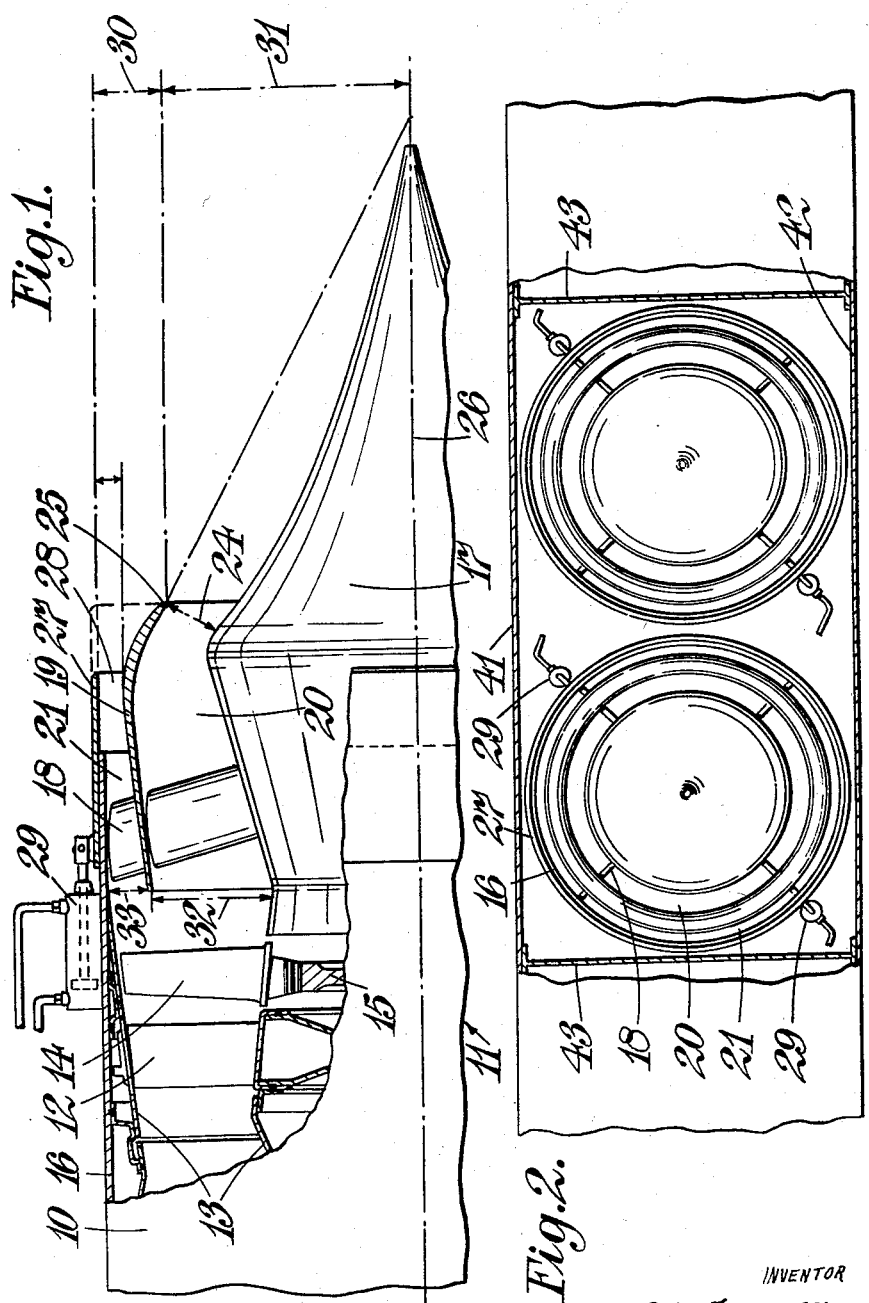

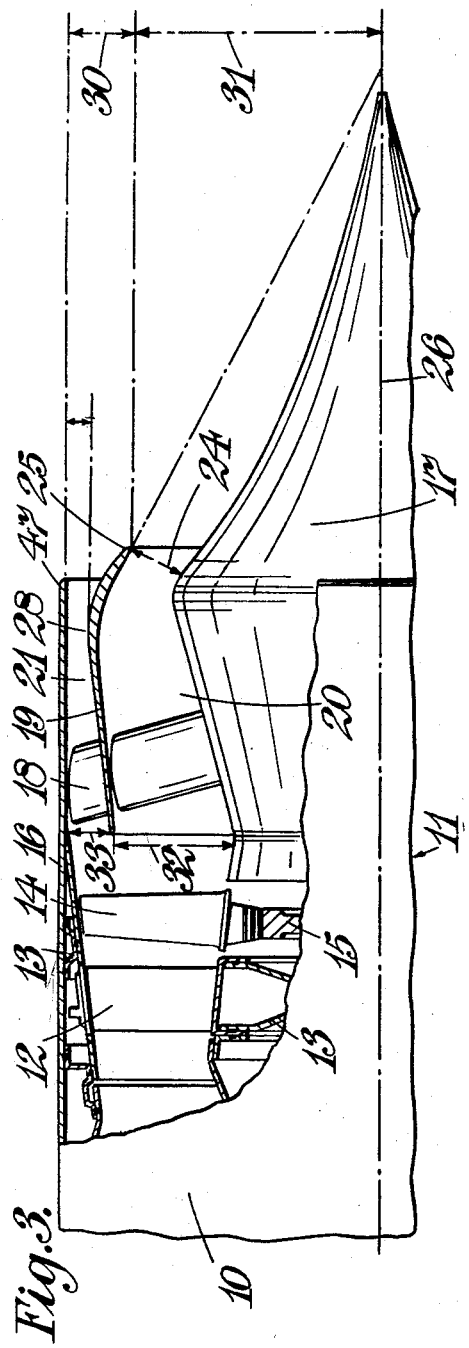

2,928,235

JET PROPULSION NOZZLE FOR SUPERSONIC FLIGHT

Christopher Linley Johnson, Allestree, England, assignor to Rolls-Royce Limited, Derby, England, a British company Application April 18, 1955, Serial No. 502,080

Claims priority, application Great Britain June 10, 1954

7 Claims. (Cl. 60—35.6)

This invention relates to nozzles for use with jet-propulsion units, such as gas turbine engines and rocket motors, and has for an object to provide a jet-propulsion nozzle suitable for use in aircraft designed to fly at speeds in excess of the speed of sound, which form of nozzle has desirable operational characteristics.

According to this invention, a jet-propulsion nozzle for use at supersonic jet velocities comprises an inner member, an annular wall coaxially surrounding the inner member to afford a first annular outlet channel therebetween, the surface of the inner member and the inner surface of the annular wall being so shaped that the throat of said first outlet channel is formed between the surface of the inner member and the lip of said annular wall and that the normal to the throat at the lip makes an angle with the nozzle axis which is substantially the calculated angle of refraction for the design Mach number and intersects the nozzle axis downstream of the nozzle, and the outer surface of the annular wall having its distance from the nozzle axis reaching a maximum at a location upstream of the lip the distance thereafter decreasing in the upstream direction, and an outer wall member coaxially surrounding the annular wall to afford a second annular outlet channel, the outer wall member being in axial section rectilinear and parallel to the nozzle axis, whereby the throat of the second annular outlet is formed in the plane of said location, said annular channels being in communication upstream of the throats, the cross-section area of the second annular channel at its throat being not substantially greater than that of the first annular channel at its throat, and the expansion ratio of the second outlet being not substantially less than that of the first outlet.

By the expansion ratio of the second outlet is meant the ratio of the area enclosed between the projections of the outer wall member and the lip of the annular wall on a plane at right angles to the nozzle axis to the throat area of the second outlet channel, and by the expansion ratio of the first outlet is meant the ratio of the area bounded by the lip of the annular wall to the throat area of the first outlet channel.

Preferably the expansion ratio of the second outlet is slightly greater than that of the first outlet. It is believed that in this way interference between the two streams is minimized.

Preferably also the cross-section area of the second annular channel at its throat is approximately half that of the first annular channel at its throat. It will be appreciated that the throat of the first annular outlet is not normal to the nozzle axis.

In one arrangement in accordance with this feature of the invention the outer wall member is supported in fixed relation to the annular wall and inner member and terminates at or downstream of the plane of the throat of the second annular channel. Preferably the outer wall member terminates between the plane of the lip of the annular wall and the plane of the throat.

In another arrangement in accordance with this feature of the invention the outer wall member is movable progressively between a first position in which its downstream edge is substantially in the plane of the throat of the second channel and a second position in which its downstream edge is further downstream, the second position being preferably substantially in the plane of the lip of the annular wall. It will be arranged that the outer wall member is retracted to the first position for subsonic and sonic velocities and is extended at supersonic velocities of the jet. The outer wall member may be retracted beyond the throat in the upstream direction to provide a larger nozzle area for starting purposes.

Preferably the ratio of the inlet areas of the first and second annular channels at the upstream end of the anular wall is substantially equal to the ratio of the throat areas of the channels.

The jet-propulsion nozzle is preferably of circular form, in which case the outer wall member will be cylindrical, and the throat will be formed in the plane of the maximum diameter of the second wall member, which will be a body of revolution. It will usually be arranged that the outer wall member is of substantially the same diameter as the engine with which the jet-propulsion nozzle is associated.

A jet-propulsion nozzle in accordance with the invention has the advantage as compared with a jet-propulsion nozzle as described in United States Patent No. 2,683,962 that for a given overall diameter of the nozzle the expansion ratio is increased, since in a nozzle in accordance with the present invention the gases are expanded to the full overall diameter.

The nozzle in accordance with the invention has the further important advantage that there is no projected area of the nozzle facing downstream within its overall diameter which will be exposed to the external airflow over the aircraft; such a projected area constitutes an inevitable source of drag on an aircraft in which the nozzle and its associated engine are installed which is of especial importance at supersonic speeds of the aircraft; a jet-propulsion nozzle in accordance with the present invention therefore permits the aircraft drag to be reduced.

In one supersonic aircraft propulsion arrangement, part of the aircraft wing is made of rectangular section with the upper and lower wing surfaces forming the longer sides of the rectangle, and a plurality of gas-turbine engines with jet nozzles according to the invention are accommodated side by side in the wing. The cusp-like spaces left between adjacent engines and the aircraft wing surfaces are employed to accommodate rams for displacing the nozzle outer walls axially. If desired, the shorter sides of the rectangular section may be formed by chordwise ribs.

Two embodiments of jet nozzle in accordance with the invention will now be described with reference to the accompanying diagrammatic drawings, of which:

Figure 1 shows a first embodiment,

Figure 2 shows an installation of the first embodiment of jet nozzle in an aircraft wing, and Figure 3 shows a second embodiment.

Referring now to Figure 1, the first embodiment of jet nozzle in accordance with the invention is shown as applied to a gas turbine jet-propulsion engine 10, of which only the rear part including a turbine 11 is shown.

The turbine 11 comprises, as is usual, a row of nozzle guide vanes 12 supported in stationary structure 13 and delivering to a row of turbine blades 14 forming part of a rotor 15. The rotor is supported on bearings in the stationary structure and drives a compressor of the engine. The stationary structure 13 extends downstream of the nozzle guide vanes 12 to provide a shroud ring for the turbine blades 14, and the engine has a cylindrical outer casing 16.

An inner exhaust bullet member 17 is supported from the outer casing 16 downstream of the turbine 11 by means of struts 18, and the member 17, which is of circular section at right angles to the engine axis, forms a fairing for the rear face of the turbine rotor disc. The struts 18 also support a circular annular wall 19 which lies between the member 17 and the casing 16.

There are thus formed a first annular outlet channel 20 between the member 17 and wall 19, and a second annular outlet channel 21 between the wall 19 and the casing 16.

The upstream end of the wall 19 is downstream of the turbine blades 14, and the exhaust gas channel between the turbine blades 14 and the upstream end of wall 19 is preferably of increasing cross-section area.

The inner surface of the annular wall 19 and the surface of the inner member 17 are so shaped that a nozzle throat 24 is formed between the lip 25 of the annular wall 19 and the surface of the inner member 17 and that the normal to the throat at the lip makes an angle with the nozzle axis 26 which is substantially the calculated angle of refraction for the design Mach number and intersects the nozzle axis downstream of the nozzle as described and claimed in United States Patent No. 2,683,962.

Downstream of the throat 24 the surface of the inner member 17 is preferably curved as described and claimed in United States Patent No. 2,683,962, but it may be conical or frusto-conical.

Coaxially outside the outer casing 16 and mounted to slide in gas sealing contact with it is an adjustable member 27, which together with the casing 16 forms the outer wall of the nozzle. The member 27 is cylindrical and so each longitudinal section thereof is a straight line parallel to the nozzle axis.

The outer surface of the annular wall 19 has a maximum diameter upstream of but adjacent to the lip 25, and thereafter decreases in diameter in the upstream direction, and thus a throat 28 is formed in the second annular channel 21 in the plane of the maximum diameter of the outer surface of the annular wall 19, between the annular wall 19 and the adjustable member 27. The throat 28 is preferably well downstream of the end of the fixed casing 16.

The adjustable member 27 is movable between a position in which its downstream edge is in the plane of the throat 28, thus providing a convergent nozzle suitable for subsonic and sonic jet velocities, and a position (indicated in dotted lines) in which its downstream edge is in or near the plane of the lip 25, thus providing a convergent-divergent nozzle suitable for supersonic jet velocities. Alternatively in the second position the adjustable member may terminate between the two planes referred to, thus reducing the travel of the member 27 on adjustment. The member 27 may also be retractable to a position in which its downstream edge is upstream of the plane of throat 28, for example in order to provide a larger exit area for starting purposes.

The adjustment of member 27 may be done by any convenient form of motor means, for example by a pneumatic ram 29.

The area of the throat 28 of the outer channel 21 should not be substantially greater than that of the throat 24 of the inner channel 20, and is preferably of the order of half the area of the throat 24; the nozzle is also arranged so that the ratio of the projected area of the annulus 30 defined between the lip 25 and the inside diameter of the adjustable member 27 to the area of the throat 28 is substantially equal to or somewhat greater than the ratio of the projected area of the circle 31 defined by the lip 25 to the area of the throat 24. It will be appreciated that the throat 24 is not normal to the nozzle axis. This relation is such that the expansion ratio of the working fluid emerging from the outer throat 28 is substantially equal to or somewhat greater than the expansion ratio of the working fluid emerging from the inner throat 24 at the design Mach number. It is believed that losses due to interference between the two streams of working fluid are minimized if the expansion ratio associated with the outer throat is slightly the greater.

It will be clear that the cross-section areas of the channels 20, 21 decrease from the upstream edge of the annular wall 19 to their respective throats 24, 28, and it is preferred that the ratio of the inlet area 32 of channel 20 to the inlet area 33 of channel 21 should be substantially equal to the ratio of the area of throat 24 to the area of throat 28.

Jet nozzles in accordance with the invention have the advantage that the jet may be expanded to the full diameter of the nozzle, thereby permitting a greater expansion ratio for a given overall diameter of nozzle than is possible with a nozzle as described and claimed in U.S. Patent No. 2,683,962.

It will also be noted that since the jet of working fluid occupies the full diameter of the engine, there is no projected area of the nozzle facing downstream within its overall diameter which will be exposed to the external airflow over the aircraft, and which would therefore cause drag.

Where a plurality of engines fitted with jet nozzles in accordance with the invention is installed in an aircraft structure, for example in an aircraft wing, tailplane, or vertical fin. The thickness of the structure need only be very slightly greater than the diameter of the jet nozzles. This is illustrated in Figure 2, where two gas turbine jet-propulsion engines as described with relation to Figure 1 are shown installed in a wing having an upper surface member 41 and a lower surface member 42. Chordwise ribs may also be provided as indicated at 43, and it is preferably arranged that the diameter of the nozzle is the same as the maximum diameter of the engine.

The motor means, such as pneumatic rams 29, for adjusting the member 27 may conveniently be positioned, as shown, in the approximately triangular spaces between adjacent engines and the upper or lower wing surfaces 41, 42, or between an engine, the adjacent rib 43, and the upper or lower wing surface. A similar arrangement may, as will be appreciated, be used for a tailplane or fin of an aircraft.

Referring now to Figure 3, there is shown an arrangement of jet nozzle which is similar to that shown in Figure 1, but in which the outlet area of the outer channel 21 is not variable. In this figure the same reference numerals are used as for corresponding parts of Figure 1.

In this arrangement, instead of the adjustable member 27 surrounding the downstream end of the casing 16 to form the outer wall of the nozzle, the casing 16 is elongated as shown at 47 so that it terminates between the plane of the maximum diameter of the outer surface of wall 19 and the plane of lip 25. The throat 28 is thus formed between the wall 19 and the part 47 of casing 16, and the length of part 47 is chosen so as to lie between the optimum position for subsonic jet velocities and that for supersonic jet velocities, and so that undue losses are not incurred under any condition of operation of the aircraft in which the engine is installed. This arrangement has the advantage of avoiding mechanical complication.

Although the arrangements of jet nozzle have been described as circular, they may be non-circular, for example elliptical. Furthermore, although described in relation to gas turbine engines, the arrangements may be applied to other types of jet-propulsion engines, for example rockets.

I claim:

1. A jet nozzle for a jet-propulsion engine for use at supersonic jet velocities comprising an inner member, an annular wall coaxially surrounding the inner member to afford a first annular outlet channel therebetween and having an inwardly curved lip at its downstream end, the surface of the inner member and the inner surface of the annular wall forming a throat in said first outlet channel between the surface of the inner member and the lip of said annular wall and that the normal to the throat at the lip makes an angle with the nozzle axis which is substantially the calculated angle of refraction for the design Mach number and intersects the nozzle axis downstream of the nozzle, and the outer surface of the annular wall having its distance from the nozzle axis reaching a maximum at a location upstream of the lip said distance thereafter decreasing in the upstream direction, and an outside wall member coaxially surrounding the annular wall to afford a second annular outlet channel, the outside wall member being internally and externally rectilinear and parallel to the nozzle axis in axial section, whereby a throat is formed in the second annular outlet in the plane of said location, said annular channels being in communication upstream of the throats, the cross-section area of the second annular channel at its throat being not substantially greater than that of the first annular channel at its throat, and the expansion ratio as hereinbefore defined of the second outlet being not substantially less than that of the first outlet.

2. A jet nozzle for a jet-propulsion engine for use at supersonic jet velocities comprising an inner member, an annular wall coaxially surrounding the inner member to afford a first annular outlet channel therebetween and having an inwardly curved lip at its downstream end, the surface of the inner member and the inner surface of the annular wall forming a throat in said first outlet channel between the surface of the inner member and the lip of said annular wall and that the normal to the throat at the lip makes an angle with the nozzle axis which is substantially the calculated angle of refraction for the design Mach number and intersects the nozzle axis downstream of the nozzle, and the outer surface of the annular wall having its distance from the nozzle axis reaching a maximum at a location upstream of the lip said distance thereafter decreasing in the upstream direction, and an outside wall member coaxially surrounding the annular wall to afford a second annular outlet channel, the outside wall member being internally and externally rectilinear and parallel to the nozzle axis in axial section, whereby a throat is formed in the second annular outlet in the plane of said location, and being movable progressively between a first position in which its downstream edge is substantially in the plane of the throat of the second channel and a second position in which its downstream edge is further downstream, said annular channels being in communication upstream of the throats, the cross-section area of the second annular channel at its throat being not substantially greater than that of the first annular channel at its throat, and the expansion ratio as hereinbefore defined of the second outlet being not substantially less than that of the first outlet.

3. A jet nozzle as claimed in claim 2, wherein the outer wall member is retractable beyond the throat in the upstream direction to provide a larger nozzle area for starting purposes.

4. A jet nozzle as claimed in claim 2, wherein in the second position, the downstream edge is substantially in the plane of the lip of the annular wall.

5. A jet nozzle as claimed in claim 4, wherein the outer wall member is retractable beyond the throat in the upstream direction to provide a larger nozzle area for starting purposes.

6. A jet nozzle as claimed in claim 1, wherein the outside wall member is supported in fixed relation to the annular wall and inner member and terminates at or downstream of the plane of the throat of the second annular channel.

7. A jet nozzle for a jet-propulsion engine for use at supersonic jet velocities comprising an inner member, an annular wall coaxially surrounding the inner member to afford a first annular outlet channel therebetween and having an inwardly curved lip at its downstream end, the surface of the inner member and the inner surface of the annular wall forming a throat in said first outlet channel between the surface of the inner member and the lip of said annular wall and that the normal to the throat at the lip makes an angle with the nozzle axis which is substantially the calculated angle of refraction for the design Mach number and intersects the nozzle axis downstream of the nozzle, and the outer surface of the annular wall having its distance from the nozzle axis reaching a maximum at a location upstream of the lip said distance thereafter decreasing in the upstream direction, and an outside wall member coaxially surrounding the annular wall to afford a second annular outlet channel, the outside wall member being internally and externally rectilinear and parallel to the nozzle axis in axial section, whereby a throat is formed in the second annular outlet in the plane of said location, said annular channels being in communication upstream of the throats, the ratio of the inlet areas of the first and second annular channels at the upstream end of the annular wall being substantially equal to the ratio of the throat areas of the channels, the cross-section area of the second annular channel at its throat being not substantially greater than that of the first annular channel at its throat, and the expansion ratio as hereinbefore defined of the second outlet being not substantially less than that of the first outlet.

References Cited in the file of this patent

UNITED STATES PATENTS

| | | |
|---|---|---|
| 2,420,323 | Meyer et al. | May 13, 1947 |
| 2,427,845 | Forsyth | Sept. 23, 1947 |
| 2,481,330 | Neal | Sept. 6, 1949 |
| 2,523,378 | Kollsman | Sept. 26, 1950 |
| 2,557,435 | Imbert | June 19, 1951 |
| 2,570,629 | Anxionnaz et al. | Oct. 9, 1951 |
| 2,575,735 | Servanty | Nov. 20, 1951 |
| 2,683,962 | Griffith | July 20, 1954 |
| 2,753,685 | Mattinson | July 10, 1956 |

FOREIGN PATENTS

| | | |
|---|---|---|
| 1,330 | Great Britain | Apr. 3, 1879 |
| 50,033 | France | Aug. 1, 1939 |
| 1,020,287 | France | Nov. 12, 1952 |